(12) United States Patent
Hämynen et al.

(10) Patent No.: US 6,889,062 B2
(45) Date of Patent: May 3, 2005

(54) SYSTEM AND PROTOCOL FOR PROVIDING PICTURES IN WIRELESS COMMUNICATION MESSAGES

(75) Inventors: Kimmo Hämynen, Espoo (FI); Johannes Lehto, Vantaa (FI); Jim Lundin, Espoo (FI); Yi-Hong Zhu, Espoo (FI); Anna Karri, Helsinki (FI); Kevin McCarthy, Vaerlose (DK)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 09/972,148

(22) Filed: Oct. 4, 2001

(65) Prior Publication Data

US 2003/0069004 A1 Apr. 10, 2003

(51) Int. Cl.[7] .................................................. H04B 1/38
(52) U.S. Cl. ..................................... 455/566; 455/412.1
(58) Field of Search ......................................... 455/412

(56) References Cited

U.S. PATENT DOCUMENTS

| 5,784,001 A | 7/1998 | Deluca et al. |
| 6,320,595 B1 * | 11/2001 | Simmons et al. ........... 345/619 |
| 2003/0034934 A1 * | 2/2003 | Breuer ...................... 345/1.1 |

FOREIGN PATENT DOCUMENTS

| KR | 2000-30215 | 6/2000 |
| WO | WO 97/19429 | 5/1997 |
| WO | WO 00/57617 | 9/2000 |

OTHER PUBLICATIONS

U.S. Appl. No. 09/864,855, filed May 23, 2001, Lehto et al.
U.S. Appl. No. 09/864,897, filed May 23, 2001, Orpano et al.
Enhanced Messaging Service White Paper, Revised Edition (Mar. 2001) Ericsson Mobile Communications AB, published on the Internet; Publication No. LZT 108 4854 R1B.
Kessler Wireless Design—SMART FAQ, published on the Internet, www.kessler–design.com, 2001 Kessler Design.

* cited by examiner

*Primary Examiner*—Creighton H. Smith
(74) *Attorney, Agent, or Firm*—Ware, Fressola, Van Der Sluys & Adolphson LLP

(57) ABSTRACT

A wireless terminal (and associated method) for communicating pictures via a wireless communication system. The pictures can be either maintained in the wireless terminal in galleries, each gallery including typically up to eight pictures, or the pictures can be stand-alone pictures. When maintained in galleries and stored in non-volatile memory of the wireless terminal, in an electronic folder, the pictures are termed clip-art pictures. The invention allows sending an entire gallery at a time as, among other formats, a single so-called Graphical Messaging System (GMS) picture (18× 72 pixels). The invention also allows sending individual clip-art pictures in a message including text, actually in-line with the text of the message or indicating where in the text the clip-art pictures would appear in a wireless terminal adapted to the invention. In addition, the invention provides a picture editor allowing a user to create or edit either a clip-art or a standalone picture.

24 Claims, 3 Drawing Sheets

SYSTEM AND PROTOCOL FOR PROVIDING PICTURES IN WIRELESS COMMUNICATION MESSAGES

RELATED APPLICATIONS

The present invention is related to the following U.S. applications:

Ser. No. 09/864,855, entitled System and Protocol for Extending Funtionality of Wireless Communication Messaging, filed May 23, 2001.

Ser. No. 09/864,897, entitled System for Personal Messaging, filed May 23, 2001.

The present invention is also related to the following international application:

International application no. PCT/EP00/02370, entitled Communication Terminal Handling Messages Including Graphics, filed Mar. 16, 2000, which claims priority to GB application no. 9906316.6, filed Mar. 18, 1999.

The related applications are assigned to the present assignee. The subject matter of the related applications are hereby incorporated by reference in their entirety.

FIELD OF THE INVENTION

The present invention pertains to wireless communication messaging (as opposed to voice wireless communication). More particularly, the present invention relates to providing messages including pictures (and possibly accompanying text) from one mobile terminal to another via for example the so-called Short Message Service.

BACKGROUND OF THE INVENTION

In recent years, data services have become popular for mobile communications systems, including the very popular so-called short messaging service (SMS), which makes use of underutilized bandwidth of signaling channels to allow short text messages. With SMS, users are able to exchange alphanumeric messages (up to 160 characters in length), and the messages are delivered within seconds of their being transmitted. Of course the networks traversed in providing the messages from one user to another must all be digital cellular networks. Although SMS was originally conceived as a paging mechanism for notifying users of the arrival of voicemail, it is now used primarily as a messaging service. A new use for SMS is a picture messaging application for cellular telephones that is presently being offered by the assignee hereof for allowing users to create and download picture messages into his or her proprietary mobile telephone (e.g., Nokia 3210 GSM) and send them to another, compatible proprietary telephone (another Nokia 3210 or a Nokia 8210 or Nokia 8850). With a likewise proprietary messaging platform (e.g., Nokia Artus Messaging Platform), operators are able to enhance usage of SMS for their subscribers. Such a simple graphic message service provides a black-and-white picture, for instance 72×28 pixels, along with a short greeting displayed below the picture. A maximum size of the greeting is specified, for example 120 characters.

What is needed is a way to create, store and edit simple clip-art type pictures for use in messages sent via wireless communication, using for example SMS. Ideally, a mobile phone would be able to store a collection of such clip-art pictures, and a user would be able to pick one or more clip-art pictures from the collection to include in a message. Even more advantageously, a user would be able to edit such clip-art pictures in the collection, or use existing clip-art pictures as the basis for new clip-art pictures that the user would create and store in the collection, and in addition, create clip-art pictures from scratch. Further, and even more ideally, a group of users in wireless communication with each other would be able to create a clip-art picture collectively, with any user in the group able to help draw the clip-art picture while all the others in the group observe the drawing.

SUMMARY OF THE INVENTION

Accordingly, the present invention provides a wireless terminal, and corresponding method for use by a wireless terminal, for communicating pictures via a wireless communication system, the wireless terminal including: a clip-art picture manager, for managing clip-art pictures including maintaining the clip-art pictures in galleries, each gallery including a plurality of clip-art pictures and each gallery of a size suitable for communication as a single wireless message, and for providing at least one clip-art picture from at least one of the galleries; a gallery folder, for storing the galleries of clip-art pictures in a memory device of the wireless terminal; a transceiver, for receiving and sending a message including at least one clip-art picture; a display screen for displaying clip-art pictures; and keys including keys of a numeric keypad as well as soft keys.

In a further aspect of the invention, the clip-art picture manager in turn includes: a gallery selector, for enabling a user to view galleries in a gallery folder, to select a gallery from the gallery folder, and to save a gallery in the gallery folder; a clip-art picture editor, for enabling a user to edit a clip-art picture in a gallery, and to create a new clip-art picture to be included in a gallery; and a gallery communicator, for selecting a gallery from the galleries in the gallery folder via the gallery selector, and for providing the selected gallery in a format suitable for transmission by the transceiver.

In another further aspect, the invention also includes a graphic message handler, for enabling a user to create a text message with at least one clip-art picture and including information indicating where in the text the clip-art picture is intended to be located, thereby providing an in-line graphics message.

In yet another further aspect of the invention, the transceiver includes an automatic recognition module, for determining whether or not a received message includes a clip-art picture. In some applications according to this aspect of the invention, the automatic recognition module also distinguishes between an in-line graphics message and a message consisting of a gallery of clip-art.

Further, in some applications in which a picture editor is provided, the picture editor of the wireless terminal communicates with a picture editor of another wireless terminal so as to allow the user of the other wireless terminal to participate in drawing a clip-art picture being created on the wireless terminal, thereby allowing group drawing of clip-art pictures.

Also further, in some applications in which a picture editor is provided, the picture editor provides an interface in which a user uses keys of the numeric keypad of the wireless terminal to draw or edit a clip-art picture, the interface providing a virtual pen in that the numeric keys of the keypad move a cursor about on the display screen of the wireless terminal, and, based on a pen state a user is able indicate to the picture editor interface, in moving the cursor from one point on the display screen to another, either a solid line results, a dashed line, a white line, or no line at all.

Still also further, in some applications in which a picture editor is provided, the picture editor provides an interface through which a user is able to add features to an existing clip-art picture, invert an existing clip-art picture, or mirror an existing clip-art picture.

From another perspective, the invention is a wireless terminal (and a corresponding method of operation of a wireless terminal) including a picture editor as generally described above but not restricted in its use to editing (including creating) clip-art pictures maintained in a gallery, and instead of use in editing stand-along pictures, and including some or all of the following capabilities (generally indicated above): allowing group editing; allowing mirroring a picture, inverting a picture, or adding a pre-drawn object to a picture (such as adding sunglasses to a smiley face); and allowing a user to indicate drawing modes (pen on or pen off) and pen states (black, white or dotted).

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides a way of sending and receiving collections or galleries of (usually relatively simple) clip-art pictures over a wireless communication system (preferably the UMTS), and for storing the clip-art pictures, each of which may be thought of as a piece of so-called clip-art (as the term is used in the context of a computer-drawing application). Each gallery preferably contains eight such clip-art pictures, and a gallery according to the invention preferably has the same size and format as a Graphical Messaging System (GMS) picture (18×72 pixels), as disclosed in international application no. PCT/EP00/02370, entitled Communication Terminal Handling Messages Including Graphics, filed Mar. 16, 2000 (which has been incorporated by reference).

Figure 1:
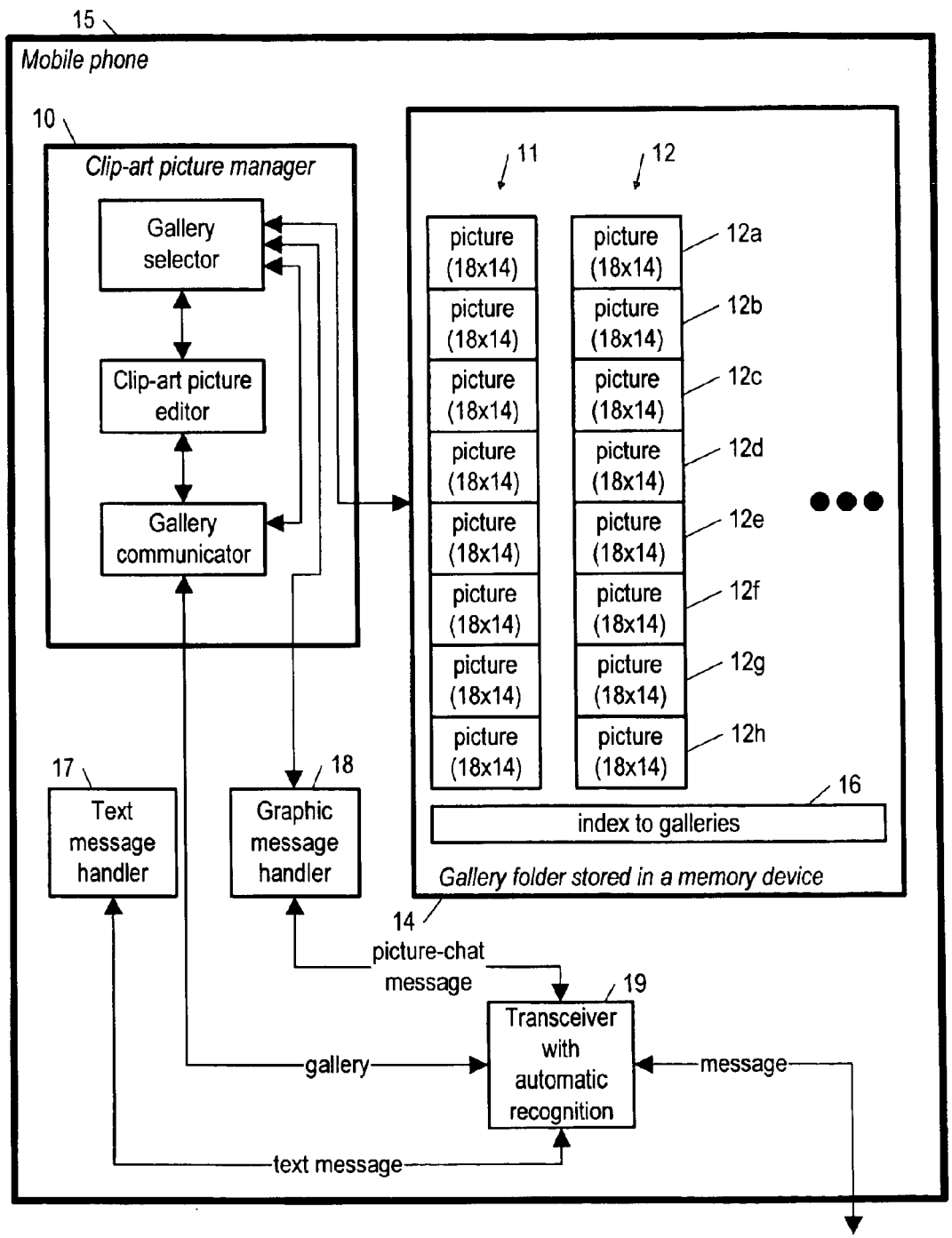
FIG. 1 is a block diagram of the components of a mobile phone needed to practice the present invention.

Referring now to FIG. 1, the invention is shown as including a clip-art picture manager 10 for creating, viewing, communicating, and saving clip-art pictures 12a, 12b, . . . , 12h, which are grouped together into galleries 11, 12, . . . , each gallery consisting of (preferably) eight clip-art pictures each of a size of 18×14 pixels so as to allow a gallery to be treated by the wireless communication system as a 72×28-pixel GMS picture. The clip-art picture manager 10 includes the following modules:

gallery selector, for enabling a user to select a particular gallery (preferably of up to eight clip-art pictures), view each of the clip-art pictures in the gallery, and for selecting a gallery to be communicated as a message;

clip-art picture editor, for enabling a user to select a particular clip-art picture (after first selecting a gallery), modify the clip-art picture, and then save the clip-art picture either in place of the original clip-art picture or as a clip-art picture in another (possibly new) gallery; and a gallery communicator, for sending a selected gallery and for receiving a transmitted gallery (and, optionally, automatically recognizing a received object as a gallery), and for storing a received gallery in a memory location in the receiving device (and for asking the user which gallery to replace if insufficient memory is available to store the receive gallery without writing over an existing gallery), and also including a formatter for converting a clip-art gallery from the format in which the clip-art galleries are stored in the gallery folder to any of a number of other formats (such as e.g. from a 72×28 GMS picture format to a 86×52 screen saver format or to a 72×28 screen saver format, or to other formats in use). Note that according to the invention, clip-art pictures can be sent only as part of a gallery, and a gallery is communicated as a picture message/media message.

The gallery selector includes a browser function (imparting to the clip-art picture manager a browse mode) enabling a user to view clip-art pictures in a gallery, as opposed to enabling a user to edit clip-art pictures or change the content of a gallery (the two latter actions being performed in edit mode using the clip-art picture editor). As indicated in FIG. 1, for sending a gallery, the gallery communicator can invoke the gallery selector to select a gallery, and can also invoke the clip-art picture editor for editing a clip-art picture (or pictures) in a gallery before sending the gallery (and not necessarily ever saving the edited gallery to the gallery folder).

Still referring to FIG. 1, the invention also provides, in the preferred embodiment, a graphic message handler 18 for handling in-line graphics messages (which include clip-art pictures from one or more galleries), described below, and, as part of a transceiver module 19, an automatic recognition module, for automatically recognizing that a received object (communicated message) includes a clip-art picture, based on a tag added to the communicated message by the sending entity. The transceiver with automatic recognition 19 directs a received message to either a text message handler 17 (if the message does not contain a clip-art picture), or to either the graphic message handler 18 (if the message is an in-line graphics message) or to the clip-art picture manager (if the message is a gallery).

In actual operation, a mobile phone (or other user equipment capable of wireless communication) in which the invention is implemented could download clip-art pictures from a clip-art picture message server (operated by one or another party who would typically accrue some advantage for making available clip-art pictures for downloading, a party such as for example a filmmaker offering clip-art pictures indicating a movie recently released by the filmmaker).

Figure 2:
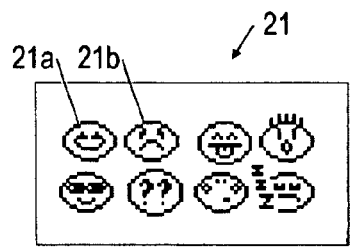
FIG. 2 is an illustration of a gallery of clip-art pictures according to the invention.

Referring now to FIG. 2, an example of a gallery according to the invention is shown as including eight clip-art pictures displayed by the clip-art picture manager 10 (FIG. 1) (i.e. more specifically by the clip-art picture editor and by the gallery selector) in a 4×2 table and maintained in the format of a single 72×28 GMS picture.

Referring now again to FIG. 1, in the preferred embodiment, galleries are stored according to the invention in a gallery folder 14 (in a memory device of the user equipment) using an index 16 maintained by the clip-art picture manager; from the gallery folder, a gallery (i.e. two or more clip-art pictures, not an individual clip-art picture) can be viewed, sent as a message or part of a message (along with text), and edited. Received galleries can be saved in the folder. (Also, as is disclosed below, a single clip-art picture, or only some of the clip-art pictures in a gallery, can be selected from a gallery and communicated in an in-line graphics message. If it is desired to communicate only the selected clip-art pictures, and not also text, the user simply composes the "in-line graphics message" without text.)

Figure 3:
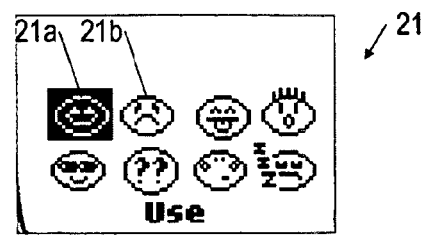
FIG. 3 is an illustration of the same gallery as illustrated in FIG. 2, but with one of the clip-art pictures having been selected.

Referring now also to FIG. 3, when the clip-art picture manager displays a gallery (i.e. a single GMS picture), the gallery is preferably displayed as eight cells in a 4×2 table, each cell holding a single clip-art picture. One gallery is displayed at a time, after having been selected using the index to the galleries in the picture folder. In the preferred embodiment, the clip-art picture manager displays one gallery at a time, and by using the NEXT_KEY and PREV_KEY, a user can select one or another of the eight clip-art pictures in a gallery (for editing or insertion in an in-line graphics message or for deletion or overwriting with another clip-art picture). (The term use is displayed to indicate that the highlighted clip-art picture has been selected.) Also in the preferred embodiment, the currently selected clip-art picture 21a is shown as a negative image (light areas appear as dark, and dark areas appear as light areas). When the currently selected clip-art picture is the last one in the gallery being displayed and the clip-art picture manager is in a browse mode (as opposed to an edit mode), pressing the NEXT key causes the clip-art picture manager to open the next gallery occurring in the index, thus allowing a user to scroll through different galleries without returning to the index.

Besides relying on a predefined format for arranging clip-art pictures in a gallery as in FIGS. 2 and 3 (showing one gallery having eight clip-art pictures in a 4×2 arrangement), the clip-art picture manager can recognize which pixels of a gallery belong to which picture based on one or another set of rules, such as that the set of all darkened pixels in which within every darkened pixel is within three pixels of at least one other darkened pixel constitutes one clip-art picture in a gallery. As another example, all darkened pixels defining a closed boundary (in that they are within some pre-determined number of pixels of each other and their interconnection defines a closed curve) and all pixels enclosed within the boundary are included in the same clip-art picture. Thus, it is not necessary that a clip-art picture be a predetermined size, and a gallery may therefore contain more or less than eight clip-art pictures.

When a user equipment receives a gallery, according to one implementation of the invention the user equipment will respond to the gallery as it would to a GMS picture, and when the user equipment displays the received object, the user will recognize that the object is a gallery according to the invention, not a GMS picture; the user can then store the gallery in the user equipment and then enter full browse mode (allowing the user to scroll from the received gallery to other already stored galleries).

In another embodiment, instead of relying on the user to recognize that the received object is a gallery (as opposed to a GMS picture), the user equipment would automatically recognize the received object as a gallery. Automatic recognition can be performed as laid out for example in the co-pending and co-owned application having Ser. No. 09/864,855, entitled System and Protocol for Extending Funtionality of Wireless Communication Messaging, filed May 23, 2001 (and already incorporated by reference).

In yet another embodiment of the gallery recognition aspect of the invention, the so-called smart messaging format can be used. (See Smart Messaging Specification, Revision 3.0, Dec. 13, 2000, Nokia Mobile Phones Ltd.)

In such an embodiment, a mobile phone would include a module (typically a software module) that would detect a gallery based on a pre-defined format that distinguishes a gallery from a GMS picture. (A small additional information element would be added to a gallery originally provided in GMS picture format, and that small additional information element would signal to the receiving user equipment that the received object is a gallery according to the invention, not a GMS picture.

In the preferred embodiment, the gallery folder can also include GMS pictures, and in the preferred embodiment, the index provides a name for each object in the folder (and optionally a date and time indicating last update to the object), and indicates to the clip-part picture manager the location of the object in non-volatile memory (i.e. where the object is stored). Thus, a gallery folder according to the invention is more 10 generally called an image object folder, and the index may have for example the following content: (GMS) picture 1, picture 2, ..., picture N, gallery 1, gallery 2, ..., gallery M, picture N+1, ....

Clip-art Picture Editor Module

Referring again to FIG. 1, the (clip-art picture) editor module of the invention enables users of a mobile phone to create and modify their own clip-art pictures, and then save the pictures in a gallery in the gallery folder 14 stored in non-volatile memory of the mobile phone. Besides creating a clip-art picture (14×18 pixels or some other size less than 72×28 pixels), the editor module enables users to create pictures in other formats, such as the GMS picture message format (72×28 pixels), or one or another screen saver format (72×28 pixels or 86×52 pixels).

Figure 4:
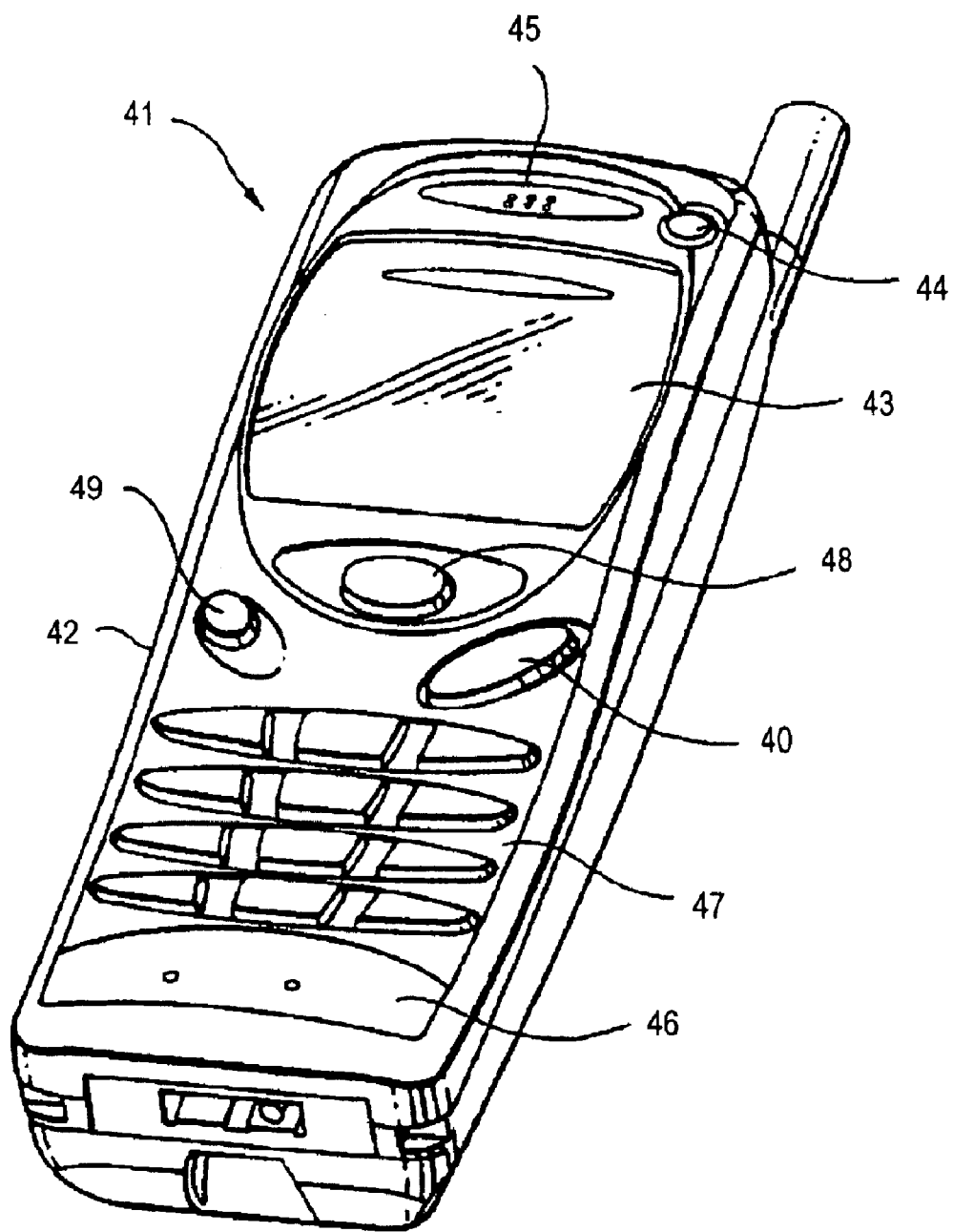
FIG. 4 is a perspective drawing of a mobile phone of a type in which the present invention can be implemented.

Referring now to FIG. 4, a mobile phone of a type in which the invention can be implemented are shown. The phone, which is generally designated by 41, comprises a user interface having a keypad 42, a display 43, an on/off button 44, a speaker 45, and a microphone 46 (only openings are shown). The phone according to the preferred embodiment is adapted for communication via a cellular network, but could have been designed for a cordless network as well. According to the preferred embodiment the keypad 42 has a first group 47 of keys as alphanumeric keys, a soft key 48, a clear key 49, and a navigation key or a scroll key 40. (A soft key is a key with which a function is associated that depends on the state of the mobile phone. There can be one or more such soft (function) keys, although in FIG. 4, only a single soft key is shown. The particular function that is associated with a soft key is indicated in the display of the mobile phone.) The present functionality of the soft key 48 is shown in a separate field in the display 43 just above the key 48.

In the preferred embodiment, in creating a clip-art picture a user uses keys of the mobile phone as cursor keys and so in effect uses the keypad as a (virtual) pen. The "pen" can be in one or another of the following states: off, black, white, or dotted. Selecting black, white or dotted turns the pen on in the selected state. The pen state can also be toggled on and off using scroll keys: scroll up turns the pen off, and scroll down turns it on in the previously selected state. The user can toggle between line colors using the # key. Moving the cursor with the pen down draws a line wherever the cursor is moved. Pressing the 5 key toggles the current pixel color (black/white) without changing the pen state. A status indicator displayed on the screen is used to indicate the current pen state to the user.

As mentioned, the cursor keys are used to draw and also to move the cursor within a picture (without drawing). Keys 2 and 8 move the cursor vertically, and keys 4 and 6 move the cursor horizontally. Keys 1, 3, 7 and 9 move the cursor diagonally. A typing (short-duration pressing) of the number keys moves the cursor one pixel at a time; the cursor can be made to move continuously by holding down a cursor key (via a typematic feature of the mobile phone).

It is of course also possible to provide an actual pen as part of the user equipment, and to have the mobile phone include a touch screen type of display screen, but in the preferred embodiment the cursor keys of a mobile phone are used to draw and otherwise move a cursor from one point to another on the mobile phone display screen, as explained above. In the preferred embodiment, a user is able to select various objects to insert into a picture, such as a circle, a rectangle, a line, or some other pre-defined shape. When the user inserts such an object into a clip-art picture, the user can use keys of the mobile phone keypad to scale the object, i.e. e.g. the "1" key would scale the object to a first, smallest size, the "2" key to the next larger size, and so on.

Also in the preferred embodiment, a user interface is provided enabling a user to select all or some of a clip-art picture and provide a clip-art picture or component thereof that is the mirror image, or the inverted image (black pixels to white pixels and conversely), or the filled image thereof. The user interface also provides, in the preferred embodiment, pre-drawn components (what is often called clip-art in drawing software packages) and enables the user to select such a component and add it to an existing picture. For example, a used could select pre-drawn sunglasses and add them to a smiley face picture.

Whether a pen or a cursor is used to create a drawing, in indicating a line (or curve) in a drawing, attributes of the line (or curve) can be selected from a menu. Thus, for example, a menu can be invoked (using one or another key on the keypad predefined to be a hotkey for invoking a pulldown menu) by a user and the user can then select the weight (thickness) of the line being drawn.

In creating a clip-art picture (as a component of a gallery), the editor allows a user to insert various objects into the picture, including: a line, rectangle, circle, (a short) text message (preferably at most 10 characters) or (a previously existing) clip-art picture (which the user would then usually modify to suit a particular application). When inserting a clip-art picture, the user is presented with an interface enabling the user to scroll through clip-art stored in the user equipment (one gallery at a time, as explained above), and then select an individual clip-art. In the preferred embodiment, the selection of one or another object, such as e.g. a circle, amounts to selecting a drawing tool. Thus, for example, choosing to insert a circle amounts to selecting the circle tool, which allows a user to draw a circle or ellipse of whatever size and shape the user would like, depending on how the tool is manipulated. A drawing tool is selected by a user from a menu of drawing tools.

If a user receives a call while editing a clip-art picture, in the preferred embodiment, the user saves the clip-art picture and then answers the call. With such a procedure, the user is then able to receive and display a graphical message and not overwrite in volatile memory the clip-art picture being edited.

Message Handler Module

Figure 5:
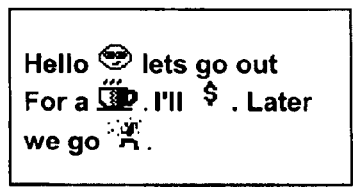
FIG. 5 is an illustration of a message with in-line graphics (clip-art pictures), according to the invention.
Figure 6:
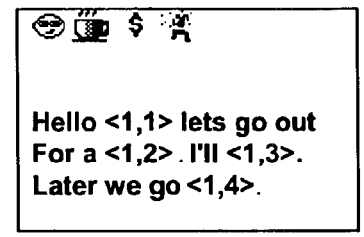
FIG. 6 is an illustration of the same message as illustrated in FIG. 5, but showing how the message would be displayed by a mobile phone not adapted to the invention (so that the clip-art pictures are not in-line, but are instead indicated by in-line tags.

Referring now to FIGS. 5 and 6, in a further aspect of the invention, a message handler (FIG. 1) is provided allowing each picture in a gallery of clip-art pictures to be inserted into a text message at a desired location, and the resulting so-called picture chat message sent and received according to a protocol in which, for mobile phones adapted to the present invention, the clip-art pictures occur in the message display interspersed with text, and for mobile phones not adapted to the present invention but able to receive GMS messages, the clip-art pictures of the invention occur at the top of the message display, and tags, each indicating a particular one of the clip-part pictures, occur interspersed with text, as shown in FIG. 5 (a display on a mobile phone adapted to the invention) and in FIG. 6 (a display on a mobile phone not adapted to the invention).

Referring again to FIG. 1, to enable a user to construct such a picture chat message, as indicated above, the invention provides a graphic message handler 18 including a message composer providing a composer mode, which in the preferred embodiment, allows a user to compose a text message as e.g. a normal smart message service (SMS) message, and insert one or more of the clip-art pictures of a gallery into the text, thereby providing a text message with in-line graphics (individual clip-art pictures). The message handler also allows a user to view a picture chat message (a view mode) with the clip-art pictures interspersed in the text, as in FIG. 5. Finally, the message handler prepares a picture-chat message for transmission by replacing the clip-art pictures with tags so that whether the receiving mobile phone is adapted to the invention or not, the user of the receiving mobile phone will still be provided with both the text and the clip-art, along with an indication (provided by the tags) of where in the text the clip-art is intended (as in FIG. 6). A phone having a graphic message handler 18 according to the invention will automatically detect that the message is a picture-chat message and engage the view mode of the message handler; the message will then display without tags, and with the clip-art pictures actually interspersed in the text (as in FIG. 5).

Note that the clip-art pictures in a gallery according to the invention could each be protected as intellectual property using for example Adobe eBook Digital Rights Management (DRM) services.

It is important to understand that a message with in-line graphics according to the invention does not convey (necessarily) an entire gallery of clip-art pictures. However, the clip-art pictures used as in-line graphics are stored and maintained as components of a gallery (of preferably up to eight clip-art pictures).

In order for a message handler to recognize that an incoming picture-chat message is such, the message handler can be implemented so as to format such a message as set out in application Ser. No. 09/864,855, entitled System and Protocol for Extending Funtionality of Wireless Communication Messaging, filed May 23, 2001 (already incorporated by reference) and application Ser. No. 09/864,897, entitled System for Personal Messaging, filed May 23, 2001 (also already incorporated by reference). Alternatively, the message handler can append a tag in the picture-chat message indicating to a suitably adapted receiving mobile phone that the message being received is a picture-chat message.

According to the invention, a picture chat message can also be sent and handled as a short-message service (SMS) based picture message including text (sent as three separate SMS messages, as disclosed in U.S. application Ser. No. 09/864,855, entitled System and Protocol for Extending Funtionality of Wireless Communication Messaging, referenced above); the receiving phone would, however, recognize the message as a picture chat message based on for example a tag accompanying the message, as mentioned above. In this way, a picture chat message could consist of an entire gallery of clip-art pictures (preferably eight clip-art pictures), and up to 120 characters less one character for each clip-art picture because one character is used as a tag for each clip-art picture indicating to the user of a mobile phone not adapted to the invention where in the text the clip-art picture is intended to be displayed. (A mobile phone adapted to practice the invention would replace the tags with the corresponding clip-art pictures.)

Group Drawing of a Clip-art Picture

In another aspect of the invention, users using different mobile phones act collectively to create a clip-art picture on one of the mobile phones. The mobiles phones can be interconnected not only by a cellular wireless communication system (such as UMTS, i.e. 3G wireless), but also by other wireless communication systems, including the well-known Bluetooth system, the General Packet Radio System (GPRS), or an Enhanced Data Rates for Global Evolution (EDGE) system. According to the invention each of the participating mobile phones can request control of the drawing interface for one task (such as inserting and sizing a circle using the circle tool), and after the task the editor application finds the next request in a queue maintained by the editor and gives control of the editor interface to the user of the mobile phone that made the request, but only for as long as is required to complete one task. Alternatively, each requester is given control of the editor interface for a predetermined time, say for example 15 seconds. At any time during a group drawing, the user of the mobile phone on which the drawing is being created, what is here called the host phone, can interrupt the process (and will usually then save the clip-art picture being created). The user of the host phone indicates an interruption using a soft key. The user of the host phone can also make a normal request, which is placed in the request queue just as are requests made by any other participating mobile phone users.

Scope of the Invention

It is to be understood that the above-described arrangements are only illustrative of the application of the principles of the present invention. In particular, aspects of the clip-art picture editor are generally advantageous. Thus, for example, the invention in respect to group editing of clip-art pictures encompasses also group editing of pictures that are not components of a gallery (i.e. are not clip-art pictures as that terminology has been used in the application). Other capabilities of the clip-art picture editor, such as inverting a picture (to obtain the photographic negative of the picture), mirroring a picture, or adding a pre-drawn component to an existing picture, are also generally advantageous, and the invention is intended to comprehend those aspects independent of whether the picture editor is being used to edit clip-art pictures. Numerous further modifications and alternative arrangements besides those indicated above may be devised by those skilled in the art without departing from the spirit and scope of the present invention, and the appended claims are intended to cover such modifications and arrangements.

What is claimed is:

1. A wireless terminal for communicating pictures via a wireless communication system, the wireless terminal comprising cellular telephone functionality and also comprising:
    A) a clip-art picture manager, for managing clip-art pictures including maintaining the clip-art pictures in galleries, each gallery including a plurality of clip-art pictures and each gallery of a size suitable for communication as a single wireless message, and for providing at least one clip-art picture from at least one of the galleries;
    B) a gallery folder, for storing the galleries of clip-art pictures in a memory device of the wireless terminal;
    C) a transceiver, for receiving and sending a message including at least one clip-art picture;
    D) a display screen for displaying clip-art pictures; and
    E) keys including keys of a numeric keypad as well as soft keys.

2. A wireless terminal as in claim 1, wherein the clip-art picture manager in turn comprises:
    a) a gallery selector, for enabling a user to view galleries in a gallery folder, to select a gallery from the gallery folder, and to save a gallery in the gallery folder;
    b) a clip-art picture editor, for enabling a user to edit a clip-art picture in a gallery, and to create a new clip-art picture to be included in a gallery;
    c) a gallery communicator, for selecting a gallery from the galleries in the gallery folder via the gallery selector, and for providing the selected gallery in a format suitable for transmission by the transceiver.

3. A wireless terminal as in claim 1, further comprising a graphic message handler, for enabling a user to create a text message with at least one clip-art picture and including information indicating where in the text the clip-art picture is intended to be located, thereby providing an in-line graphics message.

4. A wireless terminal as in claim 1, wherein the transceiver includes an automatic recognition module, for determining whether or not a received message includes a clip-art picture.

5. A wireless terminal as in claim 4, wherein the automatic recognition module further distinguishes between an in-line graphics message and a message consisting of a gallery of clip-art.

6. A wireless terminal as in claim 2, wherein the picture editor of the wireless terminal communicates with a picture editor of another wireless terminal so as to allow the user of the other wireless terminal to participate in drawing a clip-art picture being created on the wireless terminal, thereby allowing group drawing of clip-art pictures.

7. A wireless terminal as in claim 2, wherein the picture editor provides an interface in which a user uses keys of the numeric keypad of the wireless terminal to draw or edit a clip-art picture, the interface providing a virtual pen in that the numeric keys of the keypad move a cursor about on the display screen of the wireless terminal, and, based on a pen state a user is able indicate to the picture editor interface, in moving the cursor from one point on the display screen to another, either a solid line results, a dashed line, a white line, or no line at all.

8. A wireless terminal as in claim 2, wherein the picture editor provides an interface through which a user is able to add features to an existing clip-art picture, invert an existing clip-art picture, or mirror an existing clip-art picture.

9. A wireless terminal for communicating pictures via a wireless communication system, the wireless terminal comprising:
    a) a picture manager, for managing pictures including maintaining the pictures in a memory device of the wireless terminal, the picture manager in turn including a picture editor, for enabling a user to edit an existing picture or create a new picture;
    b) a transceiver, for receiving and sending a message including at least one picture;
    c) a display screen for displaying pictures; and
    d) keys including keys of a numeric keypad as well as soft keys;

wherein the picture editor of the wireless terminal communicates with a picture editor of another wireless terminal so as to allow the user of the other wireless terminal to participate in drawing a picture being created on the wireless terminal, thereby allowing group drawing of pictures.

10. The wireless terminal of claim 9, wherein, in allowing the user of the other wireless terminal to participate in drawing the picture being created on the wireless terminal, the picture editor of the wireless terminal accepts a request from the picture editor of the other wireless terminal for controlling the picture editor of the wireless terminal in order to perform a task directed to creating or altering the picture.

11. The wireless terminal of claim 9, wherein the picture editor provides an interface in which a user uses keys of the numeric keypad of the wireless terminal to draw or edit a picture, the interface providing a virtual pen in that the numeric keys of the keypad move a cursor about on the display screen of the wireless terminal, and, based on a pen state a user is able indicate to the picture editor interface, in moving the cursor from one point on the display screen to another, either a solid line results, a dashed line, a white line, or no line at all.

12. The wireless terminal of claim 9, wherein the picture editor provides an interface through which a user is able to add features to an existing picture, invert an existing picture, or mirror an existing picture.

13. A method for use by a wireless terminal, comprising cellular telephone functionality, in communicating pictures via a wireless communication system, the method comprising the steps of:
   a) storing galleries of clip-art pictures in a memory device of the wireless terminal, each gallery including at least two clip-art pictures, each gallery of a size suitable for communication as a single wireless message;
   b) managing clip-art pictures including maintaining clip-art pictures in galleries, and accepting input from a user via an interface having a numeric keypad and soft keys and a display screen by which a user is able to view and edit an existing clip-art picture in a gallery or create a new clip-art picture;
   c) receiving and sending a message including at least one clip-art picture.

14. A method as in claim 13, wherein in respect to managing clip-art pictures, the method further comprises the steps of:
   a) displaying to a user a view of galleries in a gallery folder, and accepting input from the user by which the user selects a gallery from the gallery folder, and an input by which the user saves a gallery in the gallery folder;
   b) accepting input from a user by which the user selects a gallery from the galleries in the gallery folder;
   c) providing the selected gallery in a format suitable for transmission.

15. A method as in claim 13, further comprising the step of accepting input from a user by which the user creates a text message with at least one clip-art picture and including information indicating where in the text the clip-art picture is intended to be located, thereby accepting input from the user for providing an in-line graphics message.

16. A method as in claim 13, further comprising the step of automatically recognizing whether or not a received message includes a clip-art picture.

17. A method as in claim 16, wherein the automatic recognition further distinguishes between an in-line graphics message and a message consisting of a gallery of clip-art.

18. A method as in claim 14, further comprising the step of accepting input from a user of another wireless terminal during the editing or creating of a clip-art picture so as to allow the user of the other wireless terminal to participate in drawing the clip-art picture being created on the wireless terminal, thereby allowing group drawing of clip-art pictures.

19. A method as in claim 14, wherein the interface is such that a user uses keys of the numeric keypad of the wireless terminal to draw or edit a clip-art picture, and provides a virtual pen in that the numeric keys of the keypad move a cursor about on the display screen of the wireless terminal, and, based on a pen state expressed by the user through the user interface, in moving the cursor from one point on the display screen to another, either a solid line results, a dashed line, a white line, or no line at all.

20. A method as in claim 14, wherein the interface is such that a user is able to add features to an existing clip-art picture, invert an existing clip-art picture, or mirror an existing clip-art picture.

21. A method by which to enable communicating pictures via a wireless communication system, the method comprising providing a wireless terminal comprising:
   a) a picture manager, for managing pictures including maintaining the pictures in a memory device of the wireless terminal, the picture manager in turn including a picture editor, for enabling a user to edit an existing picture or create a new picture;
   b) a transceiver, for receiving and sending a message including at least one picture;
   c) a display screen for displaying pictures; and
   d) keys including keys of a numeric keypad as well as soft keys;
   wherein the picture editor of the wireless terminal communicates with a picture editor of another wireless terminal so as to allow a user of the other wireless terminal to participate in drawing a picture being created on the wireless terminal, thereby allowing group drawing of pictures.

22. The method of claim 21, wherein, in allowing the user of the other wireless terminal to participate in drawing the picture being created on the wireless terminal, the picture editor of the wireless terminal accepts a request from the picture editor of the other wireless terminal for controlling the picture editor of the wireless terminal in order to perform a task directed to creating or altering the picture.

23. The method of claim 21, wherein the picture editor provides an interface in which a user uses keys of the numeric keypad of the wireless terminal to draw or edit a picture, the interface providing a virtual pen in that the numeric keys of the keypad move a cursor about on the display screen of the wireless terminal, and, based on a pen state a user is able indicate to the picture editor interface, in moving the cursor from one point on the display screen to another, either a solid line results, a dashed line, a white line, or no line at all.

24. The method of claim 21, wherein the picture editor provides an interface through which a user is able to add features to an existing picture, invert an existing picture, or mirror an existing picture.

* * * * *